United States Patent [19]

Slaugh

[11] 4,206,149

[45] Jun. 3, 1980

[54] AMINE PROCESS USING COPPER-RHENIUM CATALYST

[75] Inventor: Lynn H. Slaugh, Houston, Tex.

[73] Assignee: Shell Oil Company, Houston, Tex.

[21] Appl. No.: 956,297

[22] Filed: Oct. 30, 1978

Related U.S. Application Data

[63] Continuation of Ser. No. 738,815, Nov. 4, 1976, abandoned.

[51] Int. Cl.$^2$ .................. C07C 85/06; C07C 85/08
[52] U.S. Cl. .................. 260/583 R; 260/563 R; 260/563 C; 260/570.8 R; 260/570.9; 260/576; 260/577; 260/581; 260/583 H; 260/584 C; 260/585 B; 260/585 C
[58] Field of Search .......... 260/583 R, 585 B, 585 C, 260/570.9, 581; 252/463, 476

[56] References Cited

U.S. PATENT DOCUMENTS 2,285,419   6/1942   Dickey et al. .................. 260/584

FOREIGN PATENT DOCUMENTS 48-85511   2/1972   Japan .................. 260/585
49-81306   8/1974   Japan .................. 260/585
436414   10/1935   United Kingdom .................. 260/585

OTHER PUBLICATIONS

Berkman et al., "Catalysts", pp. 288–289 (1940).

*Primary Examiner*—John Doll
*Attorney, Agent, or Firm*—Howard W. Haworth

[57] ABSTRACT

Amines are produced by reacting alcohols, aldehydes or ketones with ammonia, primary or secondary amines in the presence of a catalyst having improved selectivity and stability and which comprises a mixture of copper and rhenium.

11 Claims, No Drawings

AMINE PROCESS USING COPPER-RHENIUM CATALYST

This is a continuation of application Ser. No. 738,815, filed Nov. 4, 1976, now abandoned.

BACKGROUND OF THE INVENTION

1. Field of the Invention

This invention is concerned with a process for making amines by reacting alcohols, aldehydes or ketones with ammonia, primary, or secondary amines in the presence of a catalyst comprising copper and rhenium.

2. Description of the Prior Art

A number of catalytic materials for the production of amines from alcohols have been disclosed in the prior art. British patent specification No. 436,414 discloses a large number of catalysts, typically hydrogenation catalysts, useful in producing amines from alcohols. U.S. Pat. No. 3,128,311, issued Apr. 7, 1964, reacts alcohols with ammonia in the presence of a catalyst comprising nickel, copper and an oxide of chromium, titanium, thorium, zinc or manganese. U.S. Pat. No. 3,520,933, issued July 21, 1970, discloses a number of metals that when used in combination with a pyroacid or polyacid is useful from the conversion of alcohols to amines. U.S. Pat. No. 3,383,417, issued May 14, 1968, U.S. Pat. No. 3,234,283, issued Feb. 8, 1966, Japanese patent 48-85511 issued Nov. 13, 1973 and Japanese Patent No. 49-81306 issued Aug. 6, 1974 are references related to the subject matter of the present invention.

None of the prior art disclosures indicate that the specific combination of copper and rhenium of this invention produce a synergistic effect of enhanced selectivity or catalyst stability.

SUMMARY OF THE INVENTION

This invention provides a process for producing amines by reacting alcohols, aldehydes or ketones with ammonia, primary or secondary amines in the presence of a specific catalyst. The catalyst contains a combination of two metallic components: copper and rhenium. This catalyst has the advantage of long life and high selectivity.

DESCRIPTION OF THE PREFERRED EMBODIMENTS

The Catalyst

The catalyst of this invention comprises a mixture of oxides and/or metals of copper and rhenium. The weight of the copper, calculated as percent of metal to total catalyst weight ranges from about 0.005% to about 50%, preferably from about 0.05% to about 40% and most preferably from about 0.1 to about 30%. The weight of the rhenium, calculated as percent of metal to total catalyst weight ranges from about 0.001% to about 30%, preferably from about 0.01 to about 25% and most preferably from about 0.1% to about 20%.

The carries suitable for the present process are selected from the conventional porous, heat-resistant carries, which are also resistant to the starting mixture to be used and the products formed in the reaction under the reaction conditions. The carrier may be natural or synthetic. Very suitable supports comprise those of siliceous and/or aluminus compositions. Specific examples of suitable supports are the aluminum oxides, charcoal, pumice, magnesia, zirconia, Kieselguhr, fullers' earth, silicon carbide, porous agglomerates comprising silica and/or silicon carbide, selected clays, artificial and natural zeolites, ceramics, etc. Refractory supports particularly useful in the preparation of catalysts in accordance with this invention comprise the siliceous and/or aluminous material in particular those containing gamma-alumina.

The catalyst can be prepared in a number of suitable ways, as for example, by rolling support pellets in a slurry of powders of the catalytic components. A preferred method is to impregnate the carrier with an aqueous solution of suitable salts of the active metals, and then to subsequently dry and calcine the impregnated carrier at temperatures ranging from about 100° C. to about 600° C. A preferred solvent is water, but certain organic solvents would also be suitable. Salts of the active metals soluble in the solvent are readily determined from common reference books. Useful salts for aqueous systems are chlorides, bromides, nitrates, acetates, lactates and the like. Alternatively, solutions of salts of active metal and carrier could be spray dried and calcined at temperatures from about 100° C. to about 600° C.

The catalysts used in this invention are activated before use by heating in a reducing atmosphere, for example, in hydrogen or ammonia. The preferred atmosphere is hydrogen. Activation temperatures range from about 250° C. to about 600° C. The time needed for activation will depend on the temperature, the higher the temperature, the shorter the time. Typically, useful times have been found to range from about 0.1 hour to about 24 hours, although times outside these limits are also useful, economic considerations, however, tending to dictate against their use.

The Process

Preferred reactant hydrocarbon materials are aliphatic, cycloaliphatic, araliphatic or aromatic alcohols, ketones or aldehydes having up to twenty-five, preferably up to twenty carbon atoms. These starting materials may be unsaturated, containing for example one or two olefinic double bonds. They also may contain substituents which are inert under the reaction conditions, such as alkyl groups having one to four carbon atoms which are attached via ether bridges. Particular industrial importance attaches to aliphatic or cycloaliphatic alcohols having up to twenty carbon atoms. Examples of suitable alcohols/aldehydes are ethanol/al, propanol/al, isopropanol, butanol/al, isobutanol/al, 2-ethylhexanol/al, decanol/al, dodecanol/al, hexadecanol/al, cyclopentol, cyclohexanol, cyclooctanol, cyclododecanol, benzyl alcohol/aldehyde, phenylethyl alcohol/aldehyde, 1,4-butane diol/al, 1,6-hexanediol/al, 1,5-pentadiol/al, 1,8-octanediol/al and the like. Examples of suitable ketones are acetone, methylethyl ketone, methylisobutyl ketone, phenylmethyl ketone, phenylethyl ketone, 3-decanone, 5-dodecanone, cyclopentanone, cyclohexanone, cyclooctanone, cyclododecanone and the like.

Preferred reactant amine materials are primary or secondary amines. Alkylamines, cycloalkylamines, or aralkylamines having one to twelve carbon atoms, particularly alkylamines having one to four carbon atoms and one amine group in the molecule are preferred. Examples of suitable amines are monomethylamines, dimethylamine, methylethylamine, monoethylamine, diethylamine, and the like. Preferred reactant amines are monomethylamine and dimethylamine.

The reactant alcohols, aldehydes or ketones are advantageously reacted with at least an equivalent amount of ammonia or reactant amines which are also advantageously used in excess, for example, up to 50 preferably up to 20 moles of ammonia or reactant amine per reactant hydroxyl or carbonyl group. The ratio of ammonia or reactant amine to reactant alcohol preferably ranges from about 1:1 to about 50:1.

The reaction is advantageously carried at temperatures of from about 160° C. to about 350° C. Preferred temperatures range from about 180° C. to about 300° C. Reaction pressures ranges from about 15 psi to about 4000 psi, and preferably from about 150 psi to about 1000 psi. It is preferred to carry out the reaction in the presence of hydrogen. It is advantageous to use partial pressures of hydrogen of from about 10 psi to about 3000 psi, preferably from about 100 psi to about 1000 psi. It is advantageous to use a hydrogen to alcohol, aldehyde or ketone molar ratio greater than one. The reaction system may also be partially pressurized with inert gases such as nitrogen, argon.

The reaction may be conducted batchwise or in a continuous operation. By way of illustration of the batchwise process, a high-pressure, stirred autoclave is charged with alcohol, aldehyde, or ketone, reactant amine, or ammonia and catalyst, pressurized with hydrogen, and heated to reaction temperature. After the reaction is allowed to proceed for the desired length of time, the autoclave is cooled, the excess hydrogen vented, and the products worked up by conventional methods. By way of illustration of continuous operation, a vertical, high-pressure column is charged with catalyst, and alcohol and reaction amine are supplied at the top. At the same time hydrogen is metered into the column in cocurrent or countercurrent flow. The hydrogen is advantageously recycled. During the reaction appropriate conditions of temperature and pressure are maintained. The reaction product is removed from the bottom of the column, freed from hydrogen and worked up by conventional methods. An alternate continuous process entails allowing the reaction mixture in which the catalyst is dispersed to trickle over fillers or baffles in a tower.

The process of this invention is further described by the following illustrative embodiments which are provided for illustration and are not to be construed as limiting the invention.

Illustrative Embodiment I: The Catalyst 0.3 G of rhenium trioxide was dissolved in 10 ml of dilute nitric acid. 2.9 G of copper nitrate was added to the above solution, and the resultant solution used to impregnate 25 g of 18×30 mesh Reynolds RA-1 alumina (gamma-alumina, 263 $m^2$/gm area, 0.26 cc/gm pore volume). This impregnated alumina was dried in an air stream in stages from 100° C. to 500° C. The catalyst was then reduced with nitrogen-diluted hydrogen in stages up to 500° C. The composition of the resultant catalyst was 1.9% Cu and 0.74% Re.

Illustrative Embodiment II: The Process

1. A series of alumina supported catalysts, in accord with this invention were prepared in a manner similar to that described in Illustrative Embodiment I above. The catalysts (10 cc) were individually charged to a trickle phase reactor having a volume of 25 cc and monomethylamine and 1-dodecanol were fed to the reactor at a liquid hourly space velocity of about 1 and a molar ratio of amine to alcohol of 3:1. Reactor pressure was 375 psi and was maintained by hydrogen flowing at a rate of 100 cc/min. The products were analyzed after various periods of time and the results are given in Table I.

Table I

| | Reaction of Monomethylamine and 1-Dodecanol in the Presence of Cu/Re Alumina Supported Catalyst | | | | | |
|---|---|---|---|---|---|---|
| Catalyst | Run Time Hours | Temp. °C. | Alcohol Conv., mol % | Selectivity, mol. % | | |
| | | | | $(CH_3)C_{12}H_{25}N$ | $(CH_3)_2C_{12}H_{25}N$ | $C_{24}$ & $C_{25}$ amines |
| 10%wCu/3.5%wRe | 1 | 180 | 72.8 | 83.1 | 1.6 | 14.0 |
| | 2 | 180 | 82.8 | 78.5 | 1.6 | 19.9 |
| | 3 | 180 | 91.2 | 77.4 | 0.9 | 21.7 |
| 10%wCu/0.7%wRe | 2 | 200 | 95.6 | 64.4 | 7.9 | 27.7 |
| | 3.5 | 200 | 95.4 | 67.1 | 6.9 | 26.0 |

2. A series of alumina supported catalysts in accord with this invention was prepared in a manner similar to that described in Illustrative Embodiment I above. The catalysts (10 cc) were individually charged in a trickle phase reactor having a volume of 25 cc, and dimethylamine and 1-dodecanol were fed to the reactor at a liquid hourly space velocity of about 1 and a molar ratio of amine to alcohol of 3:1. Reactor pressure was 375 psi and was maintained by hydrogen flowing at a rate of 100 cc/min. The products were analyzed after various periods of time and the results are given in Table 2.

Table 2

| | Reaction of Dimethylamine and 1-Dodecanol in the Presence of Cu/Re Alumina Supported Catalyst | | | | | |
|---|---|---|---|---|---|---|
| Catalyst | Run Time Hours | Temp. °C. | Alcohol Conv., mol % | Selectivity, mol. % | | |
| | | | | $(CH_3)_2C_{12}H_{25}N$ | $(CH_3)C_{12}H_{25}N$ | $C_{24}$ & $C_{25}$ amines |
| 1.9wCu,0.74%wRe | 1 | 227 | 96.5 | 84.6 | 7.3 | 8.2 |
| | 2 | 227 | 96.9 | 80.0 | 9.2 | 10.8 |
| 10%Cu,3.5%wRe | 2.5 | 180 | 93.6 | 77.3 | — | 15.8 |
| | 3.5 | 180 | 90.0 | 84.2 | — | 11.4 |

What is claimed is:

1. In the process for preparing amines by reacting alcohols, aldehydes or ketones having up to twenty-five carbon atoms with ammonia or primary or secondary amines having from one to eight carbon atoms in a reducing atmosphere, the improvement which comprises carrying out the reaction in the presence of a catalyst comprising a mixture of metals and oxides having from about 0.005 to about 50 percent by weight of copper, measured as the metal, and from about 0.001 to about 30 percent by weight of rhenium, measured as the metal, supported on a carrier.

2. The process of claim 1 wherein the catalyst is supported on an alumina carrier.

3. The process of claim 2 wherein the carrier is gamma-alumina.

4. The process of claim 1 wherein the reducing atmosphere is hydrogen.

5. The process of claim 4 wherein the hydrogen is maintained at a partial pressure from about 15 to about 4000 psi.

6. The process of claim 1 wherein the reaction is carried out at a temperature from about 160° C. to about 350° C.

7. The process of claim 1 wherein the weight percent of copper is from about 0.05 to about 40 percent and the rhenium is from about 0.01 to about 25 percent.

8. The process of claim 1 wherein an alcohol is reacted with monomethylamine.

9. The process of claim 8 wherein the ratio of monomethylamine to alcohol ranges from about 1:1 to about 50:1.

10. The process of claim 1 wherein an alcohol is reacted with dimethylamine.

11. The process of claim 10 wherein the ratio of dimethylamine to alcohol ranges from about 1:1 to about 50:1.

* * * * *